Figure 1:
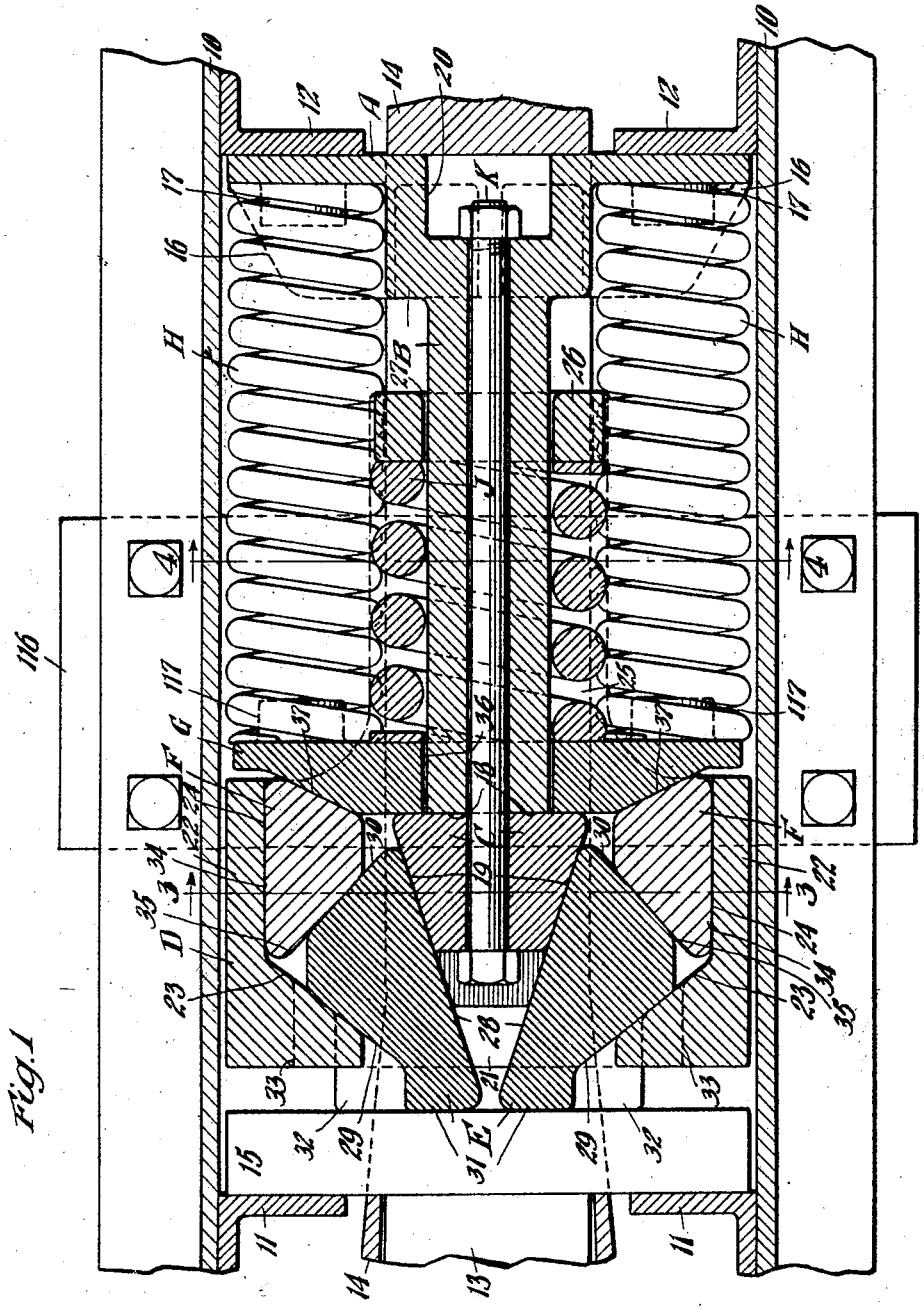

June 12, 1928. 1,673,507
S. B. HASELTINE
FRICTION SHOCK ABSORBING MECHANISM
Original Filed Nov. 9, 1923   2 Sheets-Sheet 1

Witnesses
Wm. Geiger

Inventor
Stacy B. Haseltine
By George I. Haight
His Atty.

June 12, 1928. 1,673,507
S. B. HASELTINE
FRICTION SHOCK ABSORBING MECHANISM
Original Filed Nov. 9, 1923  2 Sheets-Sheet 2
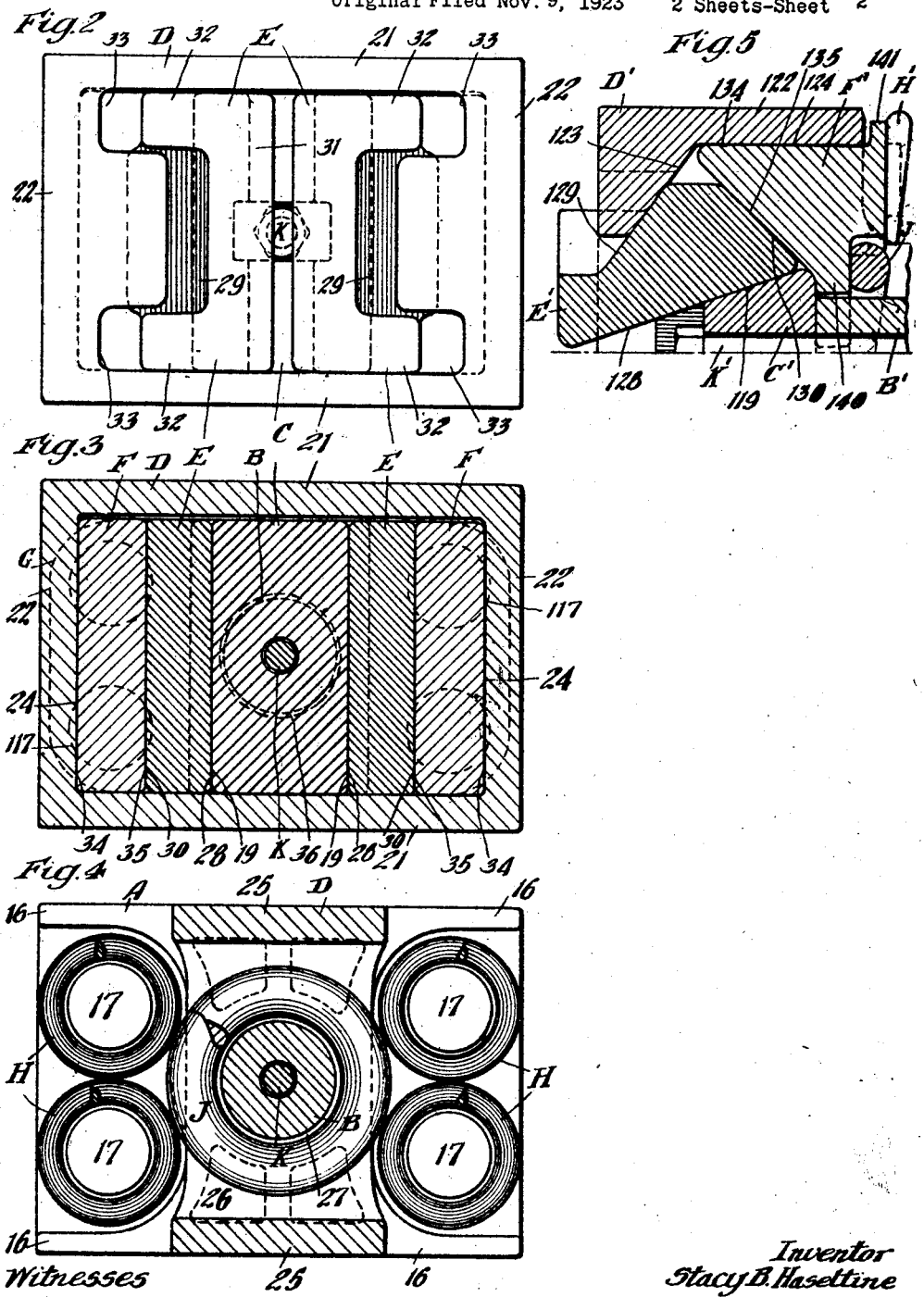
Inventor
Stacy B. Haseltine
By George J. Haight
his Atty.

Patented June 12, 1928.

1,673,507

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 9, 1923, Serial No. 673,661. Renewed April 23, 1928.

This invention relates to improvements in friction shock absorbing mechanisms.

The object of the invention is to provide a friction shock absorbing mechanism especially adapted for railway draft riggings and wherein is obtained high combined friction and spring capacity, and large wearing areas together with certain release.

More specifically, the object of this invention is to provide a mechanism of the character indicated including a movable friction shell having a friction wedge system coacting therewith, wherein the movement of the latter is resisted by a spring within the shell and the movement of the shell together with the friction wedge system is in turn opposed by a main spring resistance.

In the drawings forming a part of this specification, Figure 1 is a horizontal, longitudinal, sectional view of a railway draft rigging showing my improvements in connection therewith. Figure 2 is a front end elevational view of the shock absorbing mechanism proper. Figures 3 and 4 are vertical, transverse, sectional views, corresponding, respectively, to the lines 3—3 and 4—4 of Figure 1. And Figure 5 is a horizontal, sectional view of the front end of the shock absorbing mechanism taken at one side of the axis of the same, illustrating a different embodiment of the invention.

Referring first to the construction illustrated in Figures 1 to 4 inclusive, 10—10 denote channel shaped center or draft sills of a railway car, to the inner faces of which are secured front stop lugs 11—11 and rear stop lugs 12—12. A portion of the drawbar is indicated at 13, the same being operatively connected to a hooded yoke 14 of well-known form, within which is disposed the shock absorbing mechanism proper hereinafter described and a front follower 15. The parts are supported in operative position by a detachable saddle plate 116.

The shock absorbing mechanism proper, as shown, comprises broadly, a rear follower A; a post B formed integral with the rear follower; a wedge block C; a combined friction shell and spring cage D; a pair of wedge pressure transmitting members E—E; a pair of friction shoes F—F; a spring follower G; four main spring resistance elements H—H; an auxiliary spring resistance element J; and a retainer bolt K.

The rear follower A is in the form of a rectangular plate having upper and lower forwardly projecting flanges 16—16 and four short lugs 17—17, arranged in pairs at the opposite sides of the center thereof, each of the lugs 17 being adapted to extend into the rear end of one of the springs H to maintain the same in proper position. The rear follower A is adapted to coact with the stop lugs 12 in a well-known manner.

The post B is formed integral with the rear follower and projects forwardly therefrom, being disposed centrally of the follower and axially of the mechanism. The post B is preferably in the form of a cylindrical column having a transverse flat front end against which the rear end of the wedge block C is adapted to abut.

The wedge block C is in the form of a solid casting having a flat rear face 18, and a pair of forwardly converging side faces 19—19. The rear face 18, which engages the front end of the post B, is of greater width than the latter and extends beyond the opposite sides of the same, the projecting sides of the block being adapted to engage the front face of the spring follower G to limit the outward movement of the latter. The block C is rigidly secured to the post by a retaining bolt K which extends through alined openings in the block and post, the block being slotted transversely to receive the head of the bolt which abuts the bottom wall of the slot and the rear follower being provided with an opening 20 adapted to receive the nut which abuts the inner wall of said opening.

The combined shell and spring cage D is preferably in the form of a hollow casting open at both ends and of substantially rectangular cross section having upper and lower, spaced, parallel walls 21—21 and spaced side walls 22—22. The side walls 22 are relatively heavy at the front end of the shell as clearly shown in Figure 1. At the front end, the shell is provided with a pair of interior, oppositely disposed, rearwardly diverging wedge faces 23—23. Rearwardly of the face 23, each side wall is provided with a flat friction surface 24 extending parallel to the axis of the mechanism. The top and bottom walls 21 are extended rearwardly beyond the ends of the side walls 22 and are cut away at opposite sides thereby providing upper and lower arms 25—25. The rear ends of the arms 25 are connected by a vertically disposed web 26 serving as an abutment for the rear end of the auxiliary spring J. The web 26 is provided with an opening 27 through which the post B extends, the opening 27 being of such a size as to loosely receive the post so that the shell may move freely on the post.

The wedge pressure transmitting members E—E, which are of like construction and preferably in the form of solid blocks, are disposed on opposite sides of the block C. Each of the wedge blocks E is provided on the inner side thereof with a flat face 28 correspondingly inclined to and adapted to coact with the adjacent face 19 of the block C. On the outer side, each wedge block E is provided with a front wedge face 29 and a rear wedge face 30, the face 29 being correspondingly inclined to and adapted to coact with the face 23 of the adjacent side wall of the shell. The rear wedge faces of the blocks E converge rearwardly of the mechanism and are adapted to coact with the shoes F. Each of the blocks E is extended forwardly beyond the wedge face 29 as indicated at 31 and is provided with upper and lower, laterally projecting flanges 32—32 overhanging the major portion of the face 29. The projecting end 31 and the flanges 32 of each block E provide a flat bearing surface which abuts the flat inner surface of the front follower 15. The blocks E are adapted to slide laterally on the front follower and the heavy portions of the opposite side walls of the shell are recessed at the top and bottom as indicated at 33 to accommodate the respective flanges 32, the openings 33 and the main opening at the front end of the shell being of sufficient size to permit the full lateral movement of the blocks E during operation of the mechanism.

The friction shoes F are of like construction, being two in number and disposed on opposite sides of the mechanism. Each of the shoes F has a flat outer side face 34 adapted to coact with the adjacent face 24 of the shell, and an inner front wedge face 35 similarly inclined to and adapted to coact with the face 30 of the corresponding wedge block E.

In this connection, it is pointed out that the coacting wedge faces of the block C and the members E are preferably relatively keen with reference to the longitudinal axis of the mechanism and that the remaining wedge faces of the members E and the faces of the shell and shoes coacting therewith are relatively blunt. The coacting faces of the shell and members E are preferably blunter than the coacting faces of the shoes and the members E.

The spring follower G is in the form of a heavy rectangular plate having a central opening 36 adapted to loosely accommodate the post B. The follower G has a flat front face which is cut away at opposite sides to provide beveled faces 37 adapted to abut the rear ends of the shoes F, which are correspondingly beveled. The follower G is of greater width than the opening in the rear end of the shell so that the opposite ends of the former are adapted to provide a suitable seat for the pairs of springs H at either side of the device.

The springs H—H are arranged in pairs at opposite sides of the mechanism, and are interposed between the spring follower G and the rear follower A, the spring follower being provided with pairs of short bosses 117 on opposite sides thereof, similar to the bosses 17 of the follower A and extending into the front ends of the springs to hold the same in position. The springs H are inserted in the mechanism under initial compression and yieldingly hold the spring follower in engagement with the rear ends of the wedge block C and the wedge shoes.

The auxiliary spring J, which is relatively heavier than the springs H, surrounds the post B and has its opposite ends bearing respectively on the spring follower G and the web 26 of the shell D. The spring J is also inserted under initial compression and not only maintains the shell in engagement with the wedge system, but wear of the various friction surfaces is compensated for by the expansion thereof.

The operation of the device shown in Figures 1 to 4 inclusive is as follows, assuming a compression stroke of the mechanism. As the front follower 15 is forced inwardly of the gear, the wedge pressure transmitting members E are forced rearwardly and spread apart by the wedge block C, causing the faces 29 and 30 of the members E to slip on the faces 23 and 35 of the shell and shoes, respectively, thereby effecting a differential wedge action. At the same time, the wedge shoes are forced hard against the friction surfaces 24 of the shell. Due to this differential wedge action, the shoes and shell will be spread apart in a longitudinal direction, the shoes slipping on the friction surfaces 24 of the shell, thereby compressing the spring resistance J between the follower G and the extension at the rear end of the shell. As the members E travel rearwardly on the diverging wedge faces of the block C, in addition to their relative movement the shell and shoes will be moved bodily rearwardly against the resistance of the springs H, there being also a slight forward creeping of the shell relatively to the rearwardly moving front follower, on account of the difference in angularity of the faces of the members E which coact with the shell and block C respectively. In other words, the shell moves rearwardly at a lesser rate than the front follower. The parts are so proportioned that the front follower will engage with the front end of the wedge block C and have its movement arrested thereby before the end of the shell is engaged by the same, and before the extension on the shell engages the rear follower, there preferably being considerable clearance between these parts when the gear is fully compressed.

It will be evident that when the gear is thus fully compressed, the forces will be transmitted directly to the rear follower through the block C and the post B which together act as a solid column. Upon reduction of the compressing force, the expansion of the springs will restore the parts to normal position, outward movement of the spring follower being limited by engagement with the rear end of the block C.

The embodiment of the invention illustrated in Figure 5 differs from the construction illustrated in Figures 1 to 4 inclusive only in that the spring follower is omitted, and that the friction shoes have lugs thereon directly coacting with the wedge block on the post to limit the forward movement of the shoes. In Figure 5, the post is indicated by B′; the wedge block which is fixed thereto by C′; the friction shell by D′; the wedge pressure transmitting elements by E′; the friction shoes by F′; the main spring resistance elements by H′; the auxiliary spring resistance elements by J′; and the retainer bolt by K′. The friction shell D′ is shown as provided with side walls 122 each having a wedge face 123 and a friction face 124 coacting respectively with the wedge face 129 of one of the friction elements E′ and the friction face 134 of the friction shoe F′. Each of the wedge elements E′ is provided in addition to the face 129 with a wedge face 128 coacting with the wedge face 119 on the adjacent end of the wedge block C′ and an outer rear wedge face 130 coacting with the wedge face 135 of the adjacent shoe F′. Each shoe F′ is provided on the inner side thereof with a laterally projecting lug 140 adapted to engage the rear end of the adjacent side of the wedge block C′ to limit the outward movement of the shoe, and a lateral projection 141 on the outer side at the rear end thereof projecting beyond the plane of the inner face of the shell to provide a suitable seat for the springs H′. The operation of the embodiment of the invention illustrated in Figure 5 is in all respects similar to that previously described in connection with Figures 1 to 4, inclusive.

I have herein shown and described what I now consider the preferred manner of carrying out my invention but the same is merely illustrative and I contemplate all changes and modifications that come within the scope of the claims appended hereto.

I claim:

1. In a friction shock absorbing mechanism, the combination with front and rear follower acting means; of a movable friction shell interposed therebetween, said shell having an abutment thereon; means cooperating with one of said follower acting members for yieldingly resisting relative movement of said shell and members; a friction wedge system co-acting with the shell and the other follower member; and yielding means within the shell interposed between the friction wedge system and the abutment for opposing relative movement of said shell and friction system.

2. In a friction shock absorbing mechanism, the combination with front and rear follower members, relatively movable toward and from each other; of a movable friction shell between said members, said shell being provided with abutment means; means bearing on one of said members for yieldingly resisting movement of the shell; a wedge member fixed with reference to said last named follower member; and yielding means interposed between said friction system and abutment means for resisting relative movement of said shell and friction system.

3. In a friction shock absorbing mechanism, the combination with front and rear follower members relatively movable toward and from each other; of a movable friction shell, having interior wedge faces and friction surfaces; of a spring resistance coacting with said shell and one of said follower members; a friction wedge system within the shell, said system including coacting wedge blocks and friction shoes co-operating respectively with the wedge faces and friction surfaces of the shell; and a spring resistance interposed between the shell and said friction wedge system.

4. In a friction shock absorbing mechanism, the combination with relatively movable follower acting members; of a movable friction shell having interior wedge faces and interior friction surfaces, said shell being interposed between said members; of a spring resistance coacting with said shell and said last named member; a friction wedge system coacting with said shell, said system including wedge blocks and friction shoes coacting respectively with the wedge and friction faces of the shell, and having coacting wedge faces; of a spring independent of said first named spring resistance resisting relative movement of said wedge blocks, shoes and shell.

5. In a friction shock absorbing mechanism, the combination with front and rear relatively movable follower elements; of a movable friction shell interposed therebetween; of means for yieldingly resisting relative movement of the shell and one of said follower elements; a friction wedge system coacting with the shell and adapted to be elongated longitudinally during the compression stroke of the mechanism; and means yieldingly resisting elongation of said system.

6. In a friction shock absorbing mechanism, the combination with relatively movable follower acting members; of a friction wedge system; movable holding means embracing said wedge system, said system and means having coacting wedge faces; a spring resistance interposed between said wedge friction system and said means; and additional spring means cooperating with one of said members for resisting movement of said holding means.

7. In a friction shock absorbing mechanism, the combination with front and rear followers relatively movable toward each other; of a wedge member relatively fixed with reference to one of said followers; a pair of wedge blocks movable with the other follower coacting with said first named wedge member and adapted to be separated during relative movement of said followers; friction shoes coacting with said wedge blocks; a friction element coacting with said shoes, said friction element having an abutment wall thereon; a spring resistance interposed between said abutment wall and said shoes; and an additional spring resistance interposed between one of said followers and the friction shoes.

8. In a friction shock absorbing mechanism, the combination with front and rear main followers relatively movable toward and from each other; of a central wedge member movable with one of said followers; wedge blocks coacting with said wedge member, said blocks being movable with the other follower and adapted to be spread apart by said wedge member; friction shoes having wedge faces adapted to coact with said wedge blocks; a friction element coacting with said shoes, said element also having faces coacting with said wedge blocks; means yieldingly resisting relative movement of said element, shoes and wedge blocks; and means for yieldingly resisting movement of said friction element, shoes and wedge blocks toward one of said followers.

9. In a friction shock absorbing mechanism, the combination with two relatively movable followers; of a post rigid with one of said followers and having fixed wedge means at the free end thereof; a movable friction shell having interior friction surfaces and interior wedge faces; a plurality of friction shoes having friction surfaces coacting with said shell friction surfaces, said shoes being also provided with wedge faces; a plurality of wedge pressure transmitting members, each having a plurality of wedge faces adapted to coact with said wedging means and wedge faces of the shoes and shell, said members being movable with the other follower; a spring follower engaging the rear ends of said shoes; yielding means interposed between said shell and spring follower; and additional yielding means interposed between said spring follower and said follower having the rigid post.

10. In a friction shock absorbing mechanism, the combination with front and rear followers relatively movable toward each other; of a movable friction shell; means for yieldingly resisting movement of said shell; a post rigid with one of said followers and having wedging means at the free end thereof; a friction wedge system coacting with the shell and wedging means of said post; and means within the shell for yieldingly resisting relative movement of said shell and friction system.

11. In a friction shock absorbing mechanism, the combination with front and rear followers relatively movable toward each other; of a movable friction shell; means for yieldingly resisting movement of said shell; a wedge member relatively fixed with reference to one of said followers; a friction wedge system movable by the other follower and coacting with the shell and wedge member; means for yieldingly resisting relative movement of said shell and friction wedge system; and means for limiting the outward movement of the shell and wedge system.

12. In a friction shock absorbing mechanism, the combination with front and rear relatively movable followers; of a movable friction shell having a pair of oppositely disposed inwardly diverging wedge faces and a pair of interior friction surfaces extending parallel to the axis of the mechanism; a post rigid with one of said followers and having fixed wedging means at the free end thereof; a pair of friction shoes each having a friction surface coacting with one of said shell friction surfaces, each of said shoes also having a wedge face; a pair of wedge pressure transmitting elements movable with the other follower, each having a wedge face coacting with said fixed wedge means on said post and each having a pair of wedge faces coacting respectively with the adjacent shell and shoe wedge faces; a spring follower engaging the inner ends of said shoes; abutment means on said post adapted to limit the outward movement of said spring follower; yielding means opposing relative movement of said spring follower and shell; and additional yielding means opposing relative movement of said spring follower and said follower having the post rigid therewith.

13. In a friction shock absorbing mechanism, the combination with a follower acting member and a friction shell movable relatively thereto during the compression of the mechanism; of a plurality of wedge friction elements cooperable with said shell and certain of which are adapted to transmit the actuating pressure, said elements and shell being movable relatively to each other and also all movable bodily relative to said follower acting member; means fixed with respect to said follower cooperable with said friction elements; spring means resisting relative movement between said friction elements and shell; and additional spring means resisting relative movement between said follower and the shell and associated friction elements.

14. In a friction shock absorbing mechanism, the combination with a friction device movable as an entirety during a compression stroke, said device comprising a shell having interior friction faces and wedge faces, a spring resistance and a plurality of elements cooperable with the shell, said elements having a plurality of faces cooperating with the shell friction faces and wedge faces; of a follower acting member; a spring resistance interposed between said follower acting member and the movable friction device; and means fixed with respect to said follower cooperable with elements of said movable friction device.

15. In a friction shock absorbing mechanism, the combination with front and rear followers relatively movable toward each other; of a movable friction shell; means for yieldingly resisting movement of said shell; a column load sustaining member rigid with one of said followers and adapted to be engaged by the other follower to limit the movement thereof during a compression of the mechanism; fixed wedging means on said column load sustaining member; a friction wedge system coacting with the shell and wedging means; and means within the shell for yieldingly resisting relative movement of said shell and friction system.

16. In a friction shock absorbing mechanism, the combination with relatively movable front and rear followers; a member having wedge means thereon movable with each follower, one of said members being adapted to limit the relative movement of said followers and act as a column-load-sustaining member; a wedge friction system coacting with both of said wedge means, said system including a plurality of co-acting members, one of said members having both wedge faces and longitudinally disposed friction surfaces; and means for yieldingly resisting movement of said friction system during the compression of the mechanism.

In witness that I claim the foregoing I have hereunto subscribed my name this 22nd day of October 1923.

STACY B. HASELTINE.